(12) United States Patent
Geng et al.

(10) Patent No.: US 11,243,089 B2
(45) Date of Patent: Feb. 8, 2022

(54) NAVIGATION METHOD, NAVIGATION APPARATUS, COMPUTER READABLE MEDIUM, AND MOBILE TERMINAL

(71) Applicant: Tencent Technology (Shenzhen) Company Limited, Shenzhen (CN)

(72) Inventors: Zhixuan Geng, Shenzhen (CN); Yuanyuan Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 349 days.

(21) Appl. No.: 16/543,198

(22) Filed: Aug. 16, 2019

(65) Prior Publication Data

US 2019/0368888 A1 Dec. 5, 2019

Related U.S. Application Data

(63) Continuation of application No. PCT/CN2018/081579, filed on Apr. 2, 2018.

(30) Foreign Application Priority Data

May 17, 2017 (CN) .......................... 201710345957.3

(51) Int. Cl.
*G01C 21/36* (2006.01)
*G06F 3/0488* (2013.01)
(Continued)

(52) U.S. Cl.
CPC ....... *G01C 21/362* (2013.01); *G01C 21/3635* (2013.01); *G01C 21/3641* (2013.01);
(Continued)

(58) Field of Classification Search
None
See application file for complete search history.

(56) References Cited

U.S. PATENT DOCUMENTS

2013/0103313 A1* 4/2013 Moore ............... G01C 21/3626
701/533
2014/0114574 A1* 4/2014 Tertoolen ........... G01C 21/3676
701/533

FOREIGN PATENT DOCUMENTS

CN 105865468 A 8/2016
CN 105865470 A 8/2016
(Continued)

OTHER PUBLICATIONS

International Search Report, issued in International Application No. PCT/CN2018/081579, dated Jun. 28, 2018, pp. 1-2, State Intellectual Property Office of the P.R. China, Beijing, China.

*Primary Examiner* — Kelly D Williams
(74) *Attorney, Agent, or Firm* — Crowell & Moring LLP

(57) ABSTRACT

A navigation system may obtain a current location of the mobile terminal in a navigation session. The navigation system may determine a remaining navigation route based on the current location and a navigation end-point. The navigation system may obtain respective locations of key points in the remaining navigation route. The navigation system may obtain a map representative of a geographic area comprising the respective locations of the key points of the navigation route. The navigation system may display, in a navigation interface, the map. The navigation system may display the remaining navigation route and the key points on the displayed map.

17 Claims, 3 Drawing Sheets

(51) Int. Cl.
*H04W 4/021* (2018.01)
*H04W 4/02* (2018.01)

(52) U.S. Cl.
CPC .......... *G06F 3/0488* (2013.01); *H04W 4/021* (2013.01); *H04W 4/025* (2013.01)

(56) References Cited

FOREIGN PATENT DOCUMENTS

CN    106403983 A    2/2017
EP    0 636 863 A1   2/1995

* cited by examiner

NAVIGATION METHOD, NAVIGATION APPARATUS, COMPUTER READABLE MEDIUM, AND MOBILE TERMINAL

CROSS REFERENCE TO RELATED APPLICATIONS

This application is a continuation of International Application PCT/CN2018/081579, filed Apr. 2, 2018, entitled NAVIGATION METHOD AND DEVICE, COMPUTER READABLE MEDIUM, AND MOBILE TERMINAL, which claims priority to Chinese Patent Application No. 201710345957.3, filed on May 17, 2017, both of which are incorporated herein by reference in their entireties.

FIELD OF THE TECHNOLOGY

This application belongs to the field of navigation technology, and in particular, to mapping and situational awareness technologies.

BACKGROUND

With improvement in living standards and wide application of intelligent mobile terminals, people frequently use a navigation function of a mobile terminal. When a map is viewed for navigation, displaying of the field of view of the map provides a user with situational awareness.

SUMMARY

The subject-matter of the disclosure may relate, among others, to the following aspects. A first aspect may include a method for navigation display. The method may include obtaining, by a mobile terminal, a current location of the mobile terminal in a navigation session. The method may include determining a remaining navigation route based on the current location and a navigation end point. The method may include obtaining respective locations of key points in the remaining navigation route. The method may include obtaining a map representative of a geographic area comprising the respective locations of the key points of the navigation route. The method may include displaying, in a navigation interface, the map. The method may include displaying the remaining navigation route and the key points on the displayed map.

A second aspect may include a system for navigation display. The system may include a processor and a memory comprising instructions executable by the processor. The processor may execute the instructions to obtain a current location of the mobile terminal in a navigation session, determine a remaining navigation route based on the current location and a navigation end point, obtain respective locations of key points in the remaining navigation route, obtain a map representative of a geographic area comprising the respective locations of the key points of the navigation route, display, in a navigation interface, the map, and display the remaining navigation route and the key points on the displayed map.

A third aspect may include a non-transitory computer readable storage medium. The non-transitory computer readable storage medium may include a plurality of instructions. The instructions may be executable by a processor to obtain a current location of the mobile terminal in a navigation session, determine a remaining navigation route based on the current location and a navigation end point, obtain respective locations of key points in the remaining navigation route, obtain a map representative of a geographic area comprising the respective locations of the key points of the navigation route, display, in a navigation interface, the map, and display the remaining navigation route and the key points on the displayed map.

Additional or alternative aspects and technical advantages are described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

Present approaches to navigation include displaying a field of view of a map is to display an entire route to a user in a full view state. The full field of view of a route may be fixed. When the user has performed no operation, a presented map range is changeless, and the user can see may only see a current location of a vehicle on the route. The map in the whole journey is presented in a relative small scale state, and when the user intends to clearly see road segments and other key points through which the user has not passed, the user can only manually enlarge the map. After a particular time since the user has completed the operation, the map may restore to the full view field of view of the route. In a trip, a traveled road is displayed in the field of view, and has no much value for a user, and when the journey is traveled more than half and is close to an end point, the traveled road occupies an overwhelming majority of the field of view; and when the user intends to view a specific road segment not traveled, the user can clearly see specific information of a remaining route only by enlarging the map through a manual operation. During driving, if the user manually operates a mobile terminal frequently, not only convenience is poor, but also it is unsafe.

An example of a technical advantage provided by the system and methods described herein is that a user may view map area including only the non-traveled remaining navigation route and the key points and more clearly understand a situation of the non-traveled navigation route, thereby reducing manual operations of the user on the navigation map to view the situation of the non-traveled navigation route, improving operation convenience of the user, and improving safety during driving. Additional or alternative technical advantages are provided by systems, methods, and apparatuses described herein.

Figure 1:
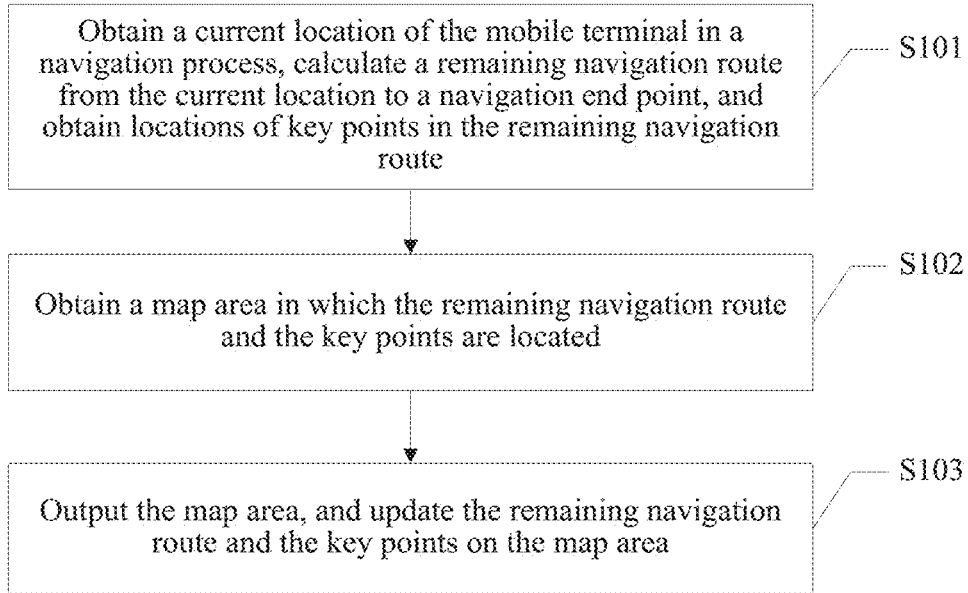
FIG. 1 is a schematic flowchart of a navigation method according to a first embodiment of this application.

Referring to FIG. 1, FIG. 1 is a schematic flowchart of a navigation method according to a first embodiment of this application. The navigation method may be applied to a mobile terminal having a navigation function, the mobile terminal includes a mobile phone, an in-vehicle navigator, a tablet computer, and the like, and the navigation function is implemented through a navigation client built in the mobile terminal. The method includes the following steps:

S101. Obtain a current location of the mobile terminal in a navigation process, calculate a remaining navigation route from the current location to a navigation end point, and obtain locations of key points in the remaining navigation route.

In the navigation process, the navigation client obtains the current location of the mobile terminal in real time or periodically according to setting of a system, and calculates the remaining navigation route from the current location to the navigation end point of the current navigation, and the remaining navigation route is a non-traveled navigation route in the current navigation.

Specifically, the calculating the remaining navigation route from the current location to the navigation end point of the current navigation may be: obtaining a route being from the current location to the navigation end point and being in the current navigation route as the remaining navigation route from the current location to the navigation end point of the current navigation.

For example, a start point of the current navigation is a site A, an end point is a site E, and the current navigation route starts from the site A, passes through a street B, a street C, and a street D, and then reaches the navigation end point, namely, the site E. If the current location is a site A', and the site A' is on the street C, the remaining navigation route starts from the site A', continues to pass through the street C and the street D, and then reaches the site E.

The calculating the remaining navigation route from the current location to the navigation end point of the current navigation may be further: calculating a plurality of navigation routes from the current location to the navigation end point according to a preset navigation rule, and selecting one navigation route from the plurality of navigation routes as the remaining navigation route according to selection of a user.

For example, a start point of the current navigation is a site A, an end point is a site E, and the current navigation route starts from the site A, passes through a street B, a street C, and a street D, and then reaches the navigation end point, namely, the site E. The current location is a site A', the site A' is on the street C, but the street D is in severe congestion. Two navigation routes are calculated according to such a congestion avoidance rule in navigation. A first navigation route starts from the site A', continues to pass through the street C, then shifts to a street F, passes through the street F, and then reaches the site E. A second navigation route starts from the site A', continues to pass through the street C, then shifts to a street G, passes through a street H, and then reaches the site E. The two routes are displayed to the user. If the user selects the first route, the first navigation route is used as the remaining navigation route.

The key points are key sites in the remaining navigation route, for example, a start point, a waypoint, and an end point corresponding to the current location in the remaining navigation route. Obtaining the locations of the key points in the navigation route is obtaining locations of the start point, the waypoint, and the end point of the remaining navigation route.

A waypoint is a traveled site from the start point of the remaining navigation route to the end point, and the waypoint may be a waypoint of interest selected by the user according to information provided by the navigation client, for example, a traveled service zone or gas station, or may be a waypoint input by the user manually.

After the remaining navigation route is calculated, the locations of the key points on the remaining navigation route are obtained.

S102. Obtain a map area in which the remaining navigation route and the key points are located.

A map is an electronic navigation map in the navigation client.

The map area is an area including the remaining navigation route and the key points on the map.

For example, the current location of the mobile terminal is the site A, and the remaining navigation route starts from the site A, passes through the street B, the street C, and the street D, and then reaches the navigation end point, namely, the site E. If there are two waypoints, namely, a site F and a site G along the route, an area formed by the site A, the site E, the site F, the site G, the street B, the street C, and the street D in the map is confirmed. Specifically, a map area that may include the site A, the site E, the site F, the site G, the street B, the street C, and the street D may be confirmed according to respective coordinates of the site A, the site E, the site F, the site G, the street B, the street C, and the street D on the map.

S103. Output the map area, and update the remaining navigation route and the key points on the map area.

The map area in which the remaining navigation route and the key points are located is output in the navigation interface. Moreover, the remaining navigation route and the to-be-updated key points are updated on the map area, that is, the remaining navigation route and the key points are correspondingly output on the map area. It should be noted that, the remaining navigation route is a route from the current location of the mobile terminal to the navigation end point, and the key points in the remaining navigation route are further output.

The navigation interface is an interface in which the navigation client displays navigation information, and is also referred to as a range of the navigation field of view, that is, a range within which the user can see the navigation information displayed on a screen of the mobile terminal. The navigation interface may occupy the entire screen according to the setting, or may occupy a part of the screen.

In this embodiment of this application, the remaining navigation route of the mobile terminal from the current location to the navigation end point is calculated in the navigation process, the locations of the key points in the remaining navigation route are obtained, the map area in which the remaining navigation route and the key points are located is confirmed, and the map area, the remaining navigation route, and the key points are output, so that navigation route related information displayed in the navigation field of view is more proper. Therefore, the user can see, on the navigation interface, the map area including only the non-traveled remaining navigation route and the key points, and more clearly understand a situation of the non-traveled navigation route, thereby reducing manual operations of the user on the navigation map to view the situation of the non-traveled navigation route, improving operation convenience of the user, and improving safety during driving.

Figure 2:
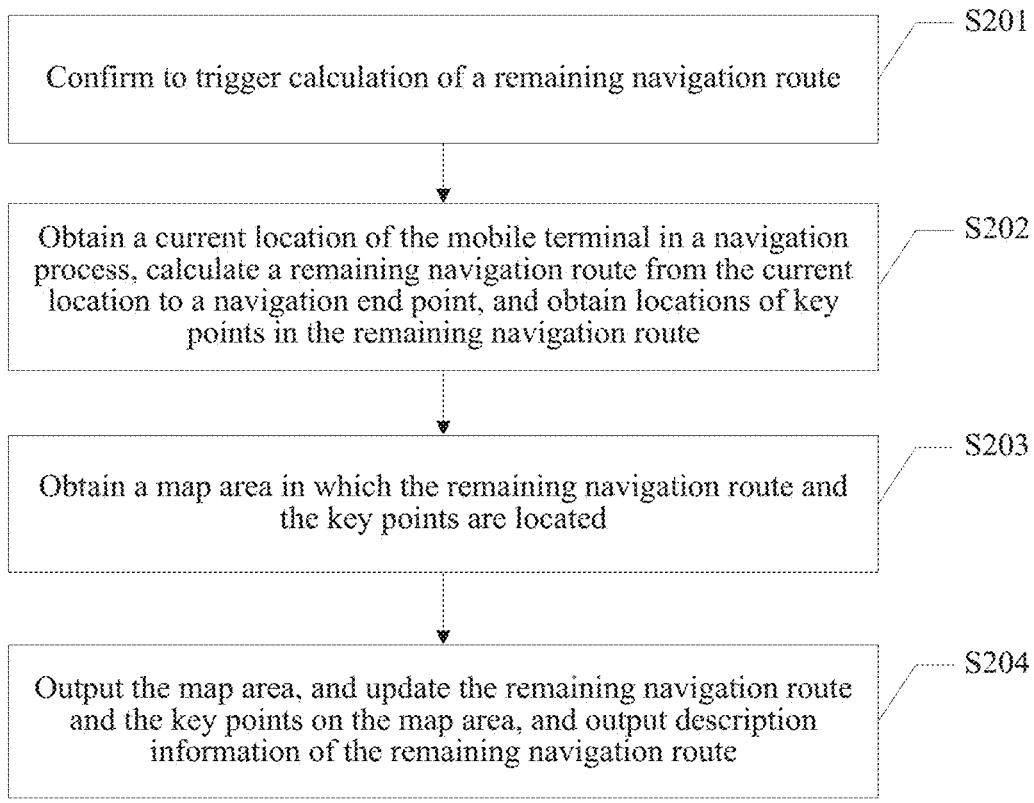
FIG. 2 is a schematic flowchart of a navigation method according to a second embodiment of this application.

Referring to FIG. 2, FIG. 2 shows a navigation method provided in a second embodiment of this application, and the method may be applied to a mobile terminal having a navigation function. The method includes the following steps:

S201. Confirm to trigger calculation of a remaining navigation route.

There are the following several manners of confirming to trigger calculation of the remaining navigation route:

First manner: a ratio of a preset unit distance on a map area to an actual distance is calculated, and when a difference between ratios is greater than a first preset value, calculation of the remaining navigation route is triggered, that is, performing of step S202 is triggered. The map area is an area including the remaining navigation route and the key points on the map.

Specifically, a ratio of a preset unit distance on a map area to an actual distance is calculated, a currently calculated ratio is a first ratio, a previously calculated ratio is a second ratio, and when a difference between the first ratio and the second ratio is greater than or equal to the first preset value, performing of the step of obtaining a current location of the mobile terminal in a navigation process is triggered.

It should be noted that, a ratio of a preset unit distance to an actual distance is a scale of a map, and each map is drawn based on a particular scale. For example, the preset unit distance is usually 1 centimeter.

For example, the first preset value is 0.05, a previously calculated first ratio of a preset unit distance on the map area to an actual distance is 1:1000, that is, 0.001, and a currently calculated second ratio of the preset unit distance on the current map area to an actual distance is 1:100, that is, 0.01. A difference between the first ratio and the second ratio is 0.009 not reaching the first preset value 0.05, and therefore it is confirmed that calculation of the remaining navigation route is not triggered. If the first preset value is 0.005, it is confirmed, when the difference between the first ratio and the second ratio is 0.009 greater than the first preset value 0.005, that calculation of the remaining navigation route is triggered.

Second manner: by calculating a change in a proportion of a length of the remaining navigation route to a length of the navigation route, whether to trigger performing of the step of obtaining the current location of the mobile terminal in the navigation process is confirmed.

Specifically, a proportion of a length of the remaining navigation route to a total route length of current navigation is calculated, and when a difference between the proportion and a current proportion is greater than or equal to a second preset value, performing of step S202 of obtaining a current location of the mobile terminal in a navigation process is triggered. The current proportion is a proportion of a previously calculated length of the remaining navigation route to the total route length of the current navigation.

For example, the second preset value is 0.1, the total route length of the current navigation is 200 kilometers, the current proportion is calculated when a length of the remaining navigation route (that is, a journey not traveled in navigation) is 80 kilometers, and the current proportion is 0.4. A length of a current remaining navigation route is 50 kilometers, a proportion of the length to the total route length 200 kilometers is 0.25, a difference between the proportion and the current proportion is 0.15 greater than the second preset value 0.1, and it is confirmed that performing of the step of obtaining a current location of the mobile terminal in a navigation process is triggered.

Third manner: by detecting a gesture operation of a user on a map, whether to trigger obtaining of the current location of the mobile terminal in the navigation process is confirmed.

Specifically, when a preset gesture operation of a user on the map is detected, if a gesture operation performed again by the user on the map has not been detected beyond a preset time length, performing of step S202 of obtaining a current location of the mobile terminal in a navigation process is triggered. The preset gesture operation may be a preset dragging or zooming gesture operation. The preset time length may be 15 seconds, and if a gesture operation performed again by the user on the map has not been detected in 15 seconds, it is confirmed that performing of the step of obtaining a current location of the mobile terminal in a navigation process is triggered.

Fourth manner: when the navigation route is updated, the step of obtaining a current location of the mobile terminal in a navigation process is triggered, where navigation route update may be displayed when the user actively re-plans the navigation route or after the user takes a wrong route, and error correction is performed through navigation logic to re-plan the navigation route.

Fifth manner: when the navigation route is displayed for the first time, that is, when the navigation route is planned successfully for the first time and displayed on the navigation map, performing of step S202 in this embodiment may be triggered.

In an embodiment of this application, when it is detected that the location of the mobile terminal is changed, or when it is detected that a change in the location of the mobile terminal reaches a preset value, for example, the preset value is 5 kilometers, that is, whenever it is detected that a change in the location of the mobile terminal reaches 5 kilometers, whether performing of the step of updating the navigation route is triggered may begin to be judged. For example, when it is detected that the location of the mobile terminal is changed, or when it is detected that a change in the location of the mobile terminal reaches a preset value, ratios of preset unit distances on the map area before update and after update to an actual distance are calculated. For another example, when it is detected that the location of the mobile terminal is changed, or when it is detected that a change in the location of the mobile terminal reaches a preset value, a change in the proportion of the length of the remaining navigation route to the length of the navigation route is calculated.

S202. Obtain a current location of the mobile terminal in a navigation process, calculate a remaining navigation route from the current location to a navigation end point, and obtain locations of key points in the remaining navigation route.

The remaining navigation route is a route from the current location to the navigation end point of the current navigation, that is, a non-traveled route in the current navigation.

The key points are key sites in the remaining navigation route, for example, a start point, a waypoint, and an end point corresponding to the current location in the remaining navigation route. Obtaining the locations of the key points in the navigation route is obtaining locations of the start point, the waypoint, and the end point of the remaining navigation route.

A waypoint is a traveled site from the start point of the remaining navigation route to the end point, and the waypoint may be a waypoint of interest selected by the user according to information provided by the navigation client, or may be a waypoint input by the user manually.

S203. Obtain a map area in which the remaining navigation route and the key points are located.

A map is an electronic navigation map in the navigation client.

The map area is an area including the remaining navigation route and the key points on the map.

The map area may be zoomed as long as the map area includes the remaining navigation route and the key points. Preferably, a minimum range that can include the remaining navigation route and the key points is selected as the map area, that is, the map area is a minimum range including the remaining navigation route, and the key points of the remaining navigation route such as a start point, an end point, and a waypoint. The minimum range may be determined through coordinates of the remaining navigation route and the key points on the map.

S204. Output the map area, and update the remaining navigation route and the key points on the map area, and output description information of the remaining navigation route.

The description information of the remaining navigation route is also referred to as key plane information, is text information related to the remaining navigation route, and includes one or more pieces of the following information: the distance of the remaining navigation route, an estimated time required for travelling the remaining navigation route, consumed expenses, estimated total expenses consumed for reaching the end point, consumed energy (e.g. gas or electricity), estimated total consumed energy for reaching the end point, and other key information displayed according to selection of the user. The description information may be in a bubble information form, such as a popup or other type of display form, to display, in a floating manner, a preset location in the navigation interface not blocking the key points, or display, in a floating manner, a preset location in the navigation interface blocking neither the remaining navigation route nor the key points. By way of example, a popup with description information may be displayed proximate (i.e. within five or less centimeters on a mobile display screen) to a position on the displayed map representative of the current location of the mobile terminal. As the map, key point(s), and/or route(s), are updated, the popup displayed on the map may move to avoid blocking display of the key point(s) and/or route (s). For example, the displayed popup may be dynamically moved on the displayed map until the popup no longer blocks the route(s) and/or key point(s).

In an embodiment of this application, in the navigation interface, a traveled navigation route between a previously obtained location of the mobile terminal and the current location is screened, and key points in the traveled navigation route are screened, so that the traveled navigation route and the key points in the traveled navigation route are not displayed in the navigation interface. For the user, practical significance of presenting the traveled navigation route and the key points in the traveled navigation route in the navigation interface is slight, so that the traveled navigation route and the key points in the traveled navigation route may be not displayed. Therefore, information related to the remaining navigation route in the navigation interface is obtained by the user more easily, thereby improving convenience of the user in obtaining information related to a non-traveled navigation route.

It should be noted that, the traveled navigation route and the key points in the traveled navigation route may be displayed in gray, so as to reduce interference of information related to the traveled navigation route to the user.

In an embodiment of this application, key point description information used to describe a key point may be further output, and the key point description information may include information such as a name of the key point, a location of the key point, a current situation of the key point, and the key point. For example, when a key point is a gas station traveled in the navigation route, information of the key point may include: a name of the gas station, a specific location of the gas station, oil price and reserve situation information of the gas station, and queuing situation information of vehicles waiting for refueling in the gas station.

In an embodiment of this application, a function of converting a waypoint of the key points into an end point may be further provided. When the user clicks the waypoint, prompt information is displayed to remind the user about whether to convert the waypoint into the end point of the current navigation. If the user confirms to convert the waypoint into the end point of the current navigation, the navigation route is calculated again and updated by using the waypoint as the end point.

Figure 3:
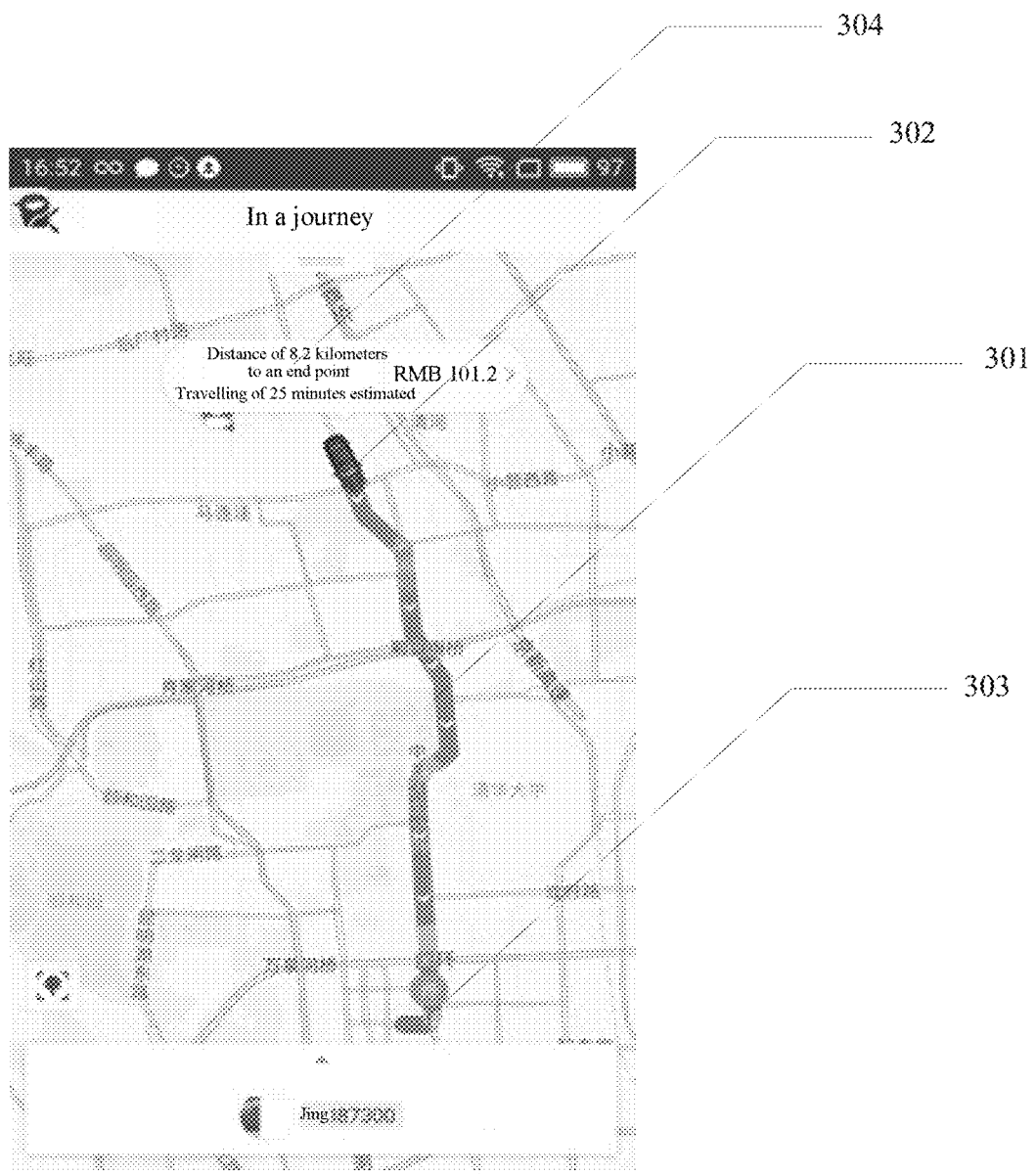
FIG. 3 is a schematic diagram of displaying a range of a navigation field of view in a navigation map according to an embodiment of this application.

For a schematic diagram of a navigation interface after outputting the map area in the navigation interface, refer to FIG. 3. A remaining navigation route 301, a site 302 of the key points at which the current location of the mobile terminal is located (that is, a start point of current update and calculation), an end point 303 of the key points, and description information 304 of the remaining navigation route displayed in a bubble form and in a float manner are displayed in the navigation interface. Moreover, the traveled navigation route is screened.

In this embodiment of this application, the remaining navigation route of the mobile terminal from the current location to the navigation end point is calculated in the navigation process, the locations of the key points in the remaining navigation route are obtained, the map area in which the remaining navigation route and the key points are located is confirmed, and the map area, the remaining navigation route, and the key points are output, so that navigation route related information displayed in the navigation field of view is more proper. Therefore, the user can see, on the navigation interface, the map area including only the non-traveled remaining navigation route and the key points, and more clearly understand a situation of the non-traveled navigation route, thereby reducing manual operations of the user on the navigation map to view the situation of the non-traveled navigation route, improving operation convenience of the user, and improving safety during driving.

Figure 4:
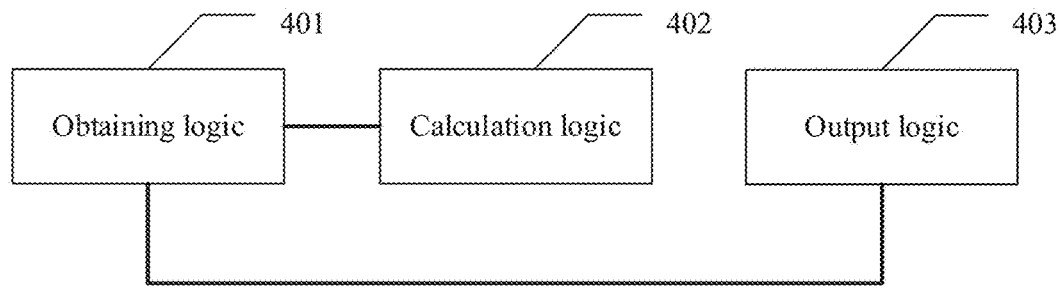
FIG. 4 is a schematic structural diagram of a navigation apparatus according to a third embodiment of this application.

Referring to FIG. 4, FIG. 4 shows a navigation apparatus provided in a third embodiment of this application. For convenience of description, only a part related to this embodiment of this application is shown. The apparatus may be built in a mobile terminal, and the apparatus includes: an obtaining logic 401, a calculation logic 402, and an output logic 403.

The obtaining logic 401 is configured to obtain a current location of a mobile terminal in a navigation process.

The calculation logic 402 is configured to calculate a remaining navigation route from the current location to a navigation end point.

A navigation client obtains the current location of the mobile terminal in real time or periodically according to setting of a system, and calculates the remaining navigation route from the current location to the navigation end point of the current navigation.

The obtaining logic 401 is further configured to obtain locations of key points in the remaining navigation route.

The key points are key sites in the remaining navigation route, for example, a start point, a waypoint, and an end point corresponding to the current location in the remaining navigation route. Obtaining the locations of the key points in the navigation route is obtaining locations of the start point, the waypoint, and the end point of the remaining navigation route.

A waypoint is a traveled site from the start point of the remaining navigation route to the end point, and the waypoint may be a waypoint of interest selected by the user according to information provided by the navigation client, for example, a traveled service zone or gas station, or may be a waypoint input by the user manually.

After the calculation logic 402 calculates the remaining navigation route, the obtaining logic 401 obtains the locations of the key points on the remaining navigation route.

The obtaining logic 401 is further configured to confirm a map area in which the remaining navigation route and the key points are located.

A map is an electronic navigation map in the navigation client.

The map area is an area including the remaining navigation route and the key points on the map.

The output logic 403 is configured to output the map area, and update the remaining navigation route and the key points on the map area.

The navigation interface is an interface in which the navigation client displays navigation information, and is also referred to as a range of the navigation field of view, that is, a range within which the user can see the navigation information displayed on a screen of the mobile terminal. The navigation interface may occupy the entire screen according to the setting, or may occupy a part of the screen.

The map area in which the remaining navigation route and the key points are located is output in the navigation interface. Moreover, the remaining navigation route and the key points are updated on the map area, that is, the remaining navigation route and the key points are correspondingly output on the map area. It should be noted that, the remaining navigation route is a route from the current location of the mobile terminal to the navigation end point, and the key points in the remaining navigation route are further output.

The apparatus in this embodiment of this application is configured to perform the foregoing method in the embodiment in FIG. 1, technical details not described are the same as those in the foregoing embodiment shown in FIG. 1, and details are not described herein again.

In this embodiment of this application, the remaining navigation route of the mobile terminal from the current location to the navigation end point is calculated in the navigation process, the locations of the key points in the remaining navigation route are obtained, the map area in which the remaining navigation route and the key points are located is confirmed, and the map area, the remaining navigation route, and the key points are output, so that navigation route related information displayed in the navigation field of view is more proper. Therefore, the user can see, on the navigation interface, the map area including only the non-traveled remaining navigation route and the key points, and more clearly understand a situation of the non-traveled navigation route, thereby reducing manual operations of the user on the navigation map to view the situation of the non-traveled navigation route, improving operation convenience of the user, and improving safety during driving.

Figure 5:
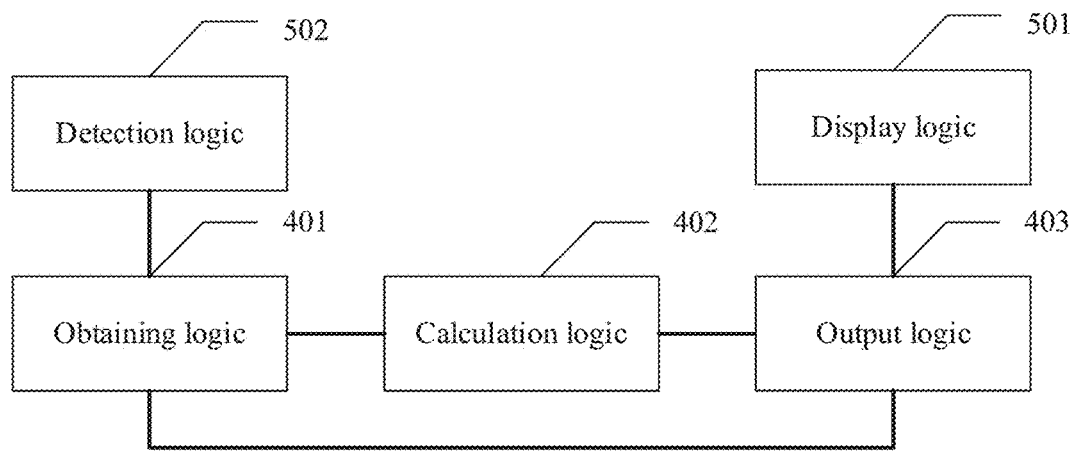
FIG. 5 is a schematic structural diagram of a navigation apparatus according to a fourth embodiment of this application.

Referring to FIG. 5, FIG. 5 shows a navigation apparatus provided in a fourth embodiment of this application. For convenience of description, only a part related to this embodiment of this application is shown. The apparatus may be built in a mobile terminal, and a difference between the apparatus shown in this embodiment and the apparatus shown in FIG. 4 is: the apparatus further includes:

a display logic 501, configured to screen a traveled navigation route between a previously obtained location of the mobile terminal and the current location, and screen key points in the traveled navigation route, so that the traveled navigation route and the key points in the traveled navigation route are not displayed in a navigation interface.

For the user, practical significance of presenting the traveled navigation route and the key points in the traveled navigation route in the navigation interface is slight, so that the traveled navigation route and the key points in the traveled navigation route may be not displayed. Therefore, information related to the remaining navigation route in the navigation interface is obtained by the user more easily, thereby improving convenience of the user in obtaining information related to a non-traveled navigation route.

In an embodiment of this application, the output logic 403 is further configured to output description information of the remaining navigation route.

The description information of the remaining navigation route is text information related to the remaining navigation route, and includes one or more pieces of the following information: the length of the remaining navigation route, an estimated time required for travelling the remaining navigation route, consumed expenses, estimated total expenses consumed for reaching the end point, and other key information displayed according to selection of the user. The description information may be in a bubble information form, to display, in a floating manner, a preset location in the navigation interface not blocking the key points, or display, in a floating manner, a preset location in the navigation interface blocking neither the remaining navigation route nor the key points.

In an embodiment of this application, the calculation logic 402 is further configured to calculate a ratio of a preset unit distance on the map area to an actual distance; and the obtaining logic 401 is further configured to perform, when a difference between a currently calculated ratio and a previously calculated ratio is greater than or equal to a first preset value, the step of obtaining a current location of the mobile terminal in a navigation process.

In an embodiment of this application, the calculation logic 402 is further configured to calculate a proportion of a length of the remaining navigation route to a total route length of current navigation.

The obtaining logic 401 is further configured to perform, when a difference between the proportion and a current proportion is greater than or equal to a second preset value, the step of obtaining a current location of the mobile terminal in a navigation process.

In an embodiment of this application, the apparatus may further include: a detection logic 502, configured to detect a preset gesture operation of a user on the map.

The obtaining logic 401 is further configured to: when a preset gesture operation of a user on the map is detected, perform, if a gesture operation performed again by the user on the map has not been detected beyond a preset time length, the step of obtaining a current location of the mobile terminal in a navigation process.

In an embodiment of this application, the calculation logic 402 further includes:

a first calculation sub-logic 4021, configured to obtain a route being from the current location to the navigation end point and being in a current navigation route as the remaining navigation route; and a second calculation sub-logic 4022, configured to calculate a plurality of navigation routes from the current location to the navigation end point according to a preset navigation rule, and select one navigation route from the plurality of navigation routes as the remaining navigation route according to selection of a user.

For technical details not described in this embodiment of this application, refer to the same technical details of the foregoing embodiments shown in FIG. 1 to FIG. 4. Details are not described herein again.

In this embodiment of this application, the remaining navigation route of the mobile terminal from the current location to the navigation end point is calculated in the navigation process, the locations of the key points in the remaining navigation route are obtained, the map area in which the remaining navigation route and the key points are located is confirmed, and the map area, the remaining navigation route, and the key points are output in the navigation interface, so that navigation route related information displayed in the navigation field of view is more proper. Therefore, the user can see, on the navigation interface, the map area including only the non-traveled remaining navigation route and the key points, and more clearly understand a situation of the non-traveled navigation route, thereby reducing manual operations of the user on the navigation map to view the situation of the non-traveled navigation route, improving operation convenience of the user, and improving safety during driving.

Figure 6:
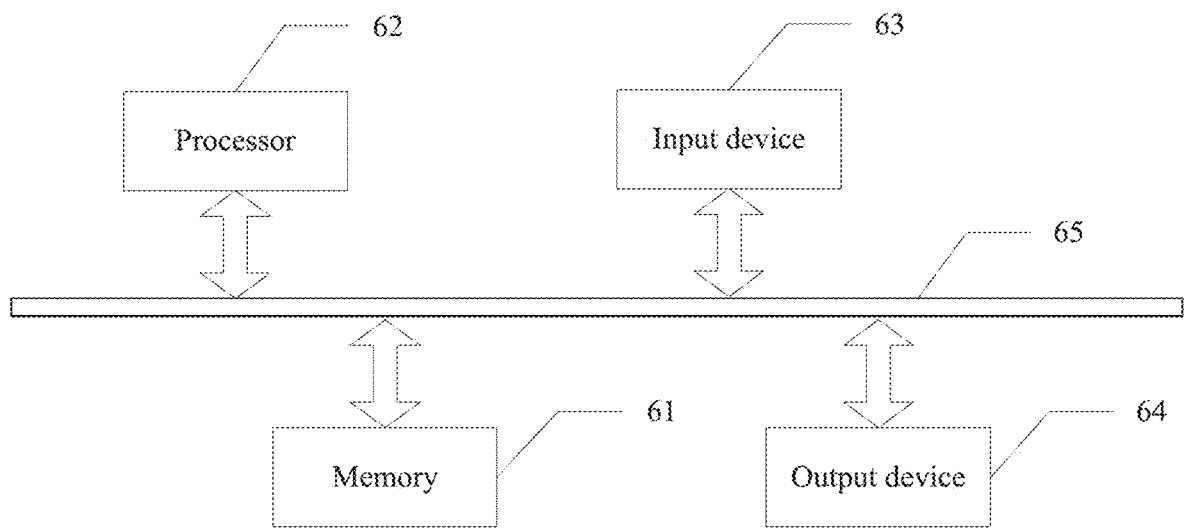
FIG. 6 is a diagram of a hardware structure of a mobile terminal for performing a navigation method according to this application.

FIG. 6 is a diagram of a hardware structure of a mobile terminal for performing a navigation method according to an embodiment of this application.

The mobile terminal described in this embodiment includes: at least one memory 61, at least one processor 62, and a computer program stored in the memory 61 and capable of being run on the processor 62, and when the processor 62 executes the program, the foregoing navigation method according to the embodiments shown in FIG. 1 and FIG. 2 is implemented.

Specifically, when the processor 62 executes the computer program stored in the memory 61, the following instructions may be implemented: obtaining a current location of the mobile terminal in a navigation process, calculating a remaining navigation route from the current location to a navigation end point, and obtaining locations of key points in the remaining navigation route; confirming a map area in which the remaining navigation route and the key points are located; and outputting the map area, and updating the remaining navigation route and the key points on the map area.

In an embodiment of this application, when the processor 62 executes the computer program stored in the memory 61, the following instruction may be further implemented: screening a traveled navigation route between a previously obtained location of the mobile terminal and the current location, and screening key points in the traveled navigation route, so that the traveled navigation route and the key points in the traveled navigation route are not displayed in a navigation interface.

In an embodiment of this application, when the processor 62 executes the computer program stored in the memory 61, the following instruction may be further implemented: outputting description information of the remaining navigation route in the navigation interface.

In an embodiment of this application, before the obtaining a current location of the mobile terminal in a navigation process, the following is included: calculating a ratio of a preset unit distance on the map area to an actual distance; and triggering, when a difference between a currently calculated ratio and a previously calculated ratio is greater than or equal to a first preset value, performing of the step of obtaining a current location of the mobile terminal in a navigation process.

In an embodiment of this application, before the obtaining a current location of the mobile terminal in a navigation process, the following is further included: calculating a proportion of a length of the remaining navigation route to a total route length of current navigation, and triggering, when a difference between the proportion and a current proportion is greater than or equal to a second preset value, performing of the step of obtaining a current location of the mobile terminal in a navigation process.

In an embodiment of this application, before the obtaining a current location of the mobile terminal in a navigation process, the following is further included: when a preset gesture operation of a user on the map is detected, triggering, if a gesture operation performed again by the user on the map has not been detected beyond a preset time length, performing of the step of obtaining a current location of the mobile terminal in a navigation process.

In an embodiment of this application, the calculating a remaining navigation route from the current location to a navigation end point includes: obtaining a route being from the current location to the navigation end point and being in a current navigation route as the remaining navigation route; or calculating a plurality of navigation routes from the current location to the navigation end point according to a preset navigation rule, and selecting one navigation route from the plurality of navigation routes as the remaining navigation route according to selection of a user.

In an embodiment of this application, the mobile terminal further includes at least one input device 63 and at least one output device 64.

The input device 63, the output device 64, the processor 62, and the memory 61 are connected through a bus 65.

The input device 63 may specifically be a camera, a touch panel, a physical key, a mouse, or the like. The output device 64 may specifically be a display screen.

The memory 61 may be a high-speed random access memory (RAM) memory, or may be a non-volatile memory, for example, a magnetic disk memory. Alternatively or in addition, the memory 61 may include a non-transitory computer readable storage medium, such as a volatile memory, a non-volatile memory, ROM, RAM, or any other suitable storage device.

In the plurality of embodiments provided in this application, it should be understood that the disclosed method and apparatus may be implemented in other manners. For example, the described apparatus embodiments are merely exemplary. For example, the logic division is merely logical function division and may be other division in actual implementation. For example, a plurality of logic or components may be combined or integrated into another system, or some features may be ignored or not performed. In addition, the displayed or discussed mutual couplings or direct couplings or communication links may be implemented by using some interfaces. The indirect couplings or communication links between the apparatuses or logic may be implemented in electronic, mechanical, or other forms.

The logic described as separate parts may or may not be physically separate, and the parts displayed as logic may or may not be physical logic, may be located in one position, or may be distributed on a plurality of network logic. Some or all of the logic may be selected according to actual needs to achieve the objectives of the solutions of the embodiments.

In addition, functional logic in the embodiments of in this application may be integrated into one processing logic, or each of the logic may exist alone physically, or two or more logic are integrated into one logic. The integrated logic may be implemented in a form of hardware, or may be implemented in a form of logical circuitry or a combination of hardware and software.

When the integrated logic is implemented in the form of a logical circuitry and sold or used as an independent product, the integrated logic may be stored or included as a computer-readable storage medium. Based on such an understanding, the technical solutions this application essentially, or the part contributing to the prior art, or all or some of the technical solutions may be implemented in a form of a product. The computer product is stored in one storage medium and includes several instructions for instructing one computer device (which may be a personal computer, a server, a network device, or the like) to perform all or some of the steps of the methods described in the embodiments of this application. The foregoing storage medium includes: any medium that can store program code, such as a USB flash memory drive, a removable hard disk, a read-only memory (ROM), a random access memory (RAM), a magnetic disk, or an optical disc.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to preferred embodiments, and the actions and logic are not necessarily required by this application.

In the foregoing embodiments, the description of each embodiment has respective focuses. For a part that is not described in detail in an embodiment, reference may be made to related descriptions in other embodiments.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Detailed above are the navigation method, the navigation apparatus, and the mobile terminal provided in this application. While various embodiments have been described, it will be apparent to those of ordinary skill in the art that many more embodiments and implementations are possible. Accordingly, the embodiments described herein are examples, not the only possible embodiments and implementations.

What is claimed is:

1. A method for navigation display, comprising:
    detecting a preset gesture operation on a region of a display interface including the map;
    determining a preset time duration elapsed without detection of an additional gesture operation;
    obtaining, by a mobile terminal, a current location of the mobile terminal in a navigation session in response to the preset time duration being elapsed without detection of the additional gesture operation;
    determining a remaining navigation route based on the current location and a navigation end point;
    displaying a map comprising the remaining navigation route; and
    dynamically zooming in the map to keep the remaining navigation route displayed in the displayed map.

2. The method of claim 1, further comprising:
    identifying a traveled navigation route between a previously obtained location of the mobile terminal and the current location; and
    removing, from the displayed map, key points of the traveled navigation route so that the traveled navigation route and the key points of the traveled navigation route are not displayed.

3. The method of claim 1, further comprising:
    determining a position on the displayed map representative of the current location of the mobile terminal; and
    displaying a popup proximate to the position, the displayed popup comprising description information corresponding to the remaining navigation route, the description information comprising a distance of the remaining navigation route, an estimated time for traveling the remaining navigation route, or any combination thereof.

4. The method of claim 3, further comprising:
    determining the displayed popup blocks at least a portion of the remaining navigation route; and
    dynamically moving the displayed popup until the displayed popup no longer blocks the remaining navigation route.

5. The method of claim 1, further comprising:
    displaying a preset unit distance;
    calculating a ratio of the preset unit distance on the map to an actual distance; and
    determining a difference between the ratio and a previously calculated ratio is greater than a preset threshold, wherein obtaining the current location of the mobile terminal in the navigation session further comprises:
        obtaining, in response to the difference between the ratio and the previously calculated ratio being greater than the preset threshold, the current location of the mobile terminal in the navigation session.

6. The method of claim 1, further comprising:
    determining a proportion based on a first length of the remaining navigation route and a total length of an active route for the navigation session; and
    determining a difference between the proportion and a previously determined proportion is greater than a preset threshold; wherein the step of obtaining the current location of the mobile terminal in the navigation session further comprises:

obtaining, in response to the difference between the proportion and the previously determined proportion being greater than the preset threshold, the current location of the mobile terminal in a navigation process.

7. The method of claim 1, wherein determining the remaining navigation route from the current location to the navigation end point further comprises:
   determining an active navigation route based on a start location and an end location; and
   selecting, as the remaining navigation route, a portion of the active navigation route between the current location and the navigation end point.

8. The method of claim 1, wherein calculating the remaining navigation route from the current location to the navigation end point further comprises:
   calculating a plurality of navigation routes from the current location to the navigation end point according to a preset navigation rule;
   receiving an input selection indicative of one of the navigation routes; and
   selecting, as the remaining navigation route, the one of the navigation routes.

9. A system for navigation display, the system comprising:
   a processor and a memory comprising instructions executable by the processor, the processor configured execute the instructions to:
   detect a preset gesture operation on a region of a display interface including the display map;
   determine a preset time duration elapsed without detection of an additional gesture operation;
   obtain a current location of a mobile terminal in a navigation session in response to the preset time duration being elapsed without detection of the additional gesture operation;
   determine a remaining navigation route based on the current location and a navigation end point;
   obtain respective locations of key points in the remaining navigation route;
   obtain a map representative of a geographic area comprising the respective locations of the key points of the remaining navigation route;
   display the map on a navigation interface; and
   display the remaining navigation route and the key points on the displayed map.

10. The system of claim 9, further comprising the processor configured to execute the instructions to:
    identify a traveled navigation route between a previously obtained location of the mobile terminal and the current location; and
    remove, from the displayed map, key points of the traveled navigation route, so that the traveled navigation route and the key points of the traveled navigation route are not displayed on the navigation interface.

11. The system of claim 9, further comprising the processor configured to execute the instructions to:
    display a preset unit distance on the navigation interface;
    calculate a ratio of the preset unit distance on the displayed map to an actual distance;
    determine a difference between the ratio and a previously calculated ratio is greater than a preset threshold; and
    obtain, in response to the difference between the ratio and the previously calculated ratio being greater than the preset threshold, the current location of the mobile terminal in the navigation session.

12. The system of claim 9, further comprising the processor configured to execute the instructions to:
    determine a proportion based on a first length of the remaining navigation route and a total length of an active route for the navigation session;
    determine a difference between the proportion and a previously determined proportion is greater than a preset threshold; and
    obtain, in response to the difference between the proportion and the previously determined proportion being greater than the preset threshold, the current location of the mobile terminal in a navigation process.

13. The system of claim 9, wherein the processor configured to execute the instructions to determine the remaining navigation route from the current location to the navigation end point further comprises the processor configured to:
    determine an active navigation route based on a start location and an end location; and
    select, as the remaining navigation route, a portion of the active navigation route between the current location and the navigation end point.

14. A non-transitory computer readable storage medium comprising:
    a plurality of instructions executable by a processor to:
    detect a preset gesture operation on a region of a display interface including the displayed map;
    determine a preset time duration elapsed without detection of an additional gesture operation;
    obtain a current location of a mobile terminal in a navigation session in response to the preset time duration being elapsed without detection of the additional gesture operation;
    determine a remaining navigation route based on the current location and a navigation end point;
    obtain respective locations of key points in the remaining navigation route;
    obtain a map representative of a geographic area comprising the respective locations of the key points of the remaining navigation route;
    display the map on a navigation interface; and
    display the remaining navigation route and the key points on the displayed map.

15. The non-transitory computer readable storage medium of claim 14, further comprising the instructions executable by a processor to:
    identify a traveled navigation route between a previously obtained location of the mobile terminal and the current location; and
    remove, from the displayed map, key points of the traveled navigation route, so that the traveled navigation route and the key points of the traveled navigation route are not displayed on the navigation interface.

16. The non-transitory computer readable storage medium of claim 14, further comprising the instructions executable by a processor to:
    display a preset unit distance on the navigation interface;
    calculate a ratio of the preset unit distance on the displayed map to an actual distance;
    determine a difference between the ratio and a previously calculated ratio is greater than a preset threshold; and
    obtain, in response to the difference between the ratio and the previously calculated ratio being greater than the preset threshold, the current location of the mobile terminal in the navigation session.

17. The non-transitory computer readable storage medium of claim 14, further comprising the instructions executable by a processor to:

determine a proportion based on a first length of the remaining navigation route and a total length of an active route for the navigation session;
determine a difference between the proportion and a previously determined proportion is greater than a preset threshold; and
obtain, in response to the difference between the proportion and the previously determined proportion being greater than the preset threshold, the current location of the mobile terminal in a navigation process.

* * * * *